US006252654B1

(12) United States Patent
Kaya

(10) Patent No.: US 6,252,654 B1
(45) **Date of Patent: *Jun. 26, 2001**

(54) INDICATING DEVICE USED FOR A PAPER CASSETTE AND FOR INDICATING A REMAINING AMOUNT OF RECORDING PAPERS

(75) Inventor: Akimasa Kaya, Saitama (JP)

(73) Assignee: Fuji Photo Film Co., Ltd., Kanagawa (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/422,341

(22) Filed: Oct. 21, 1999

(30) Foreign Application Priority Data

Oct. 23, 1998 (JP) ............................................. 10-302161

(51) Int. Cl.$^{7}$ ............................ G03B 27/58; G03B 27/62; G03B 27/00; G03B 1/66

(52) U.S. Cl. .............................. 355/408; 355/72; 355/75; 396/284

(58) Field of Search ....................... 355/72–75, 407–408; 396/284; 271/127, 160–162, 171, 110, 111; 399/16–17, 23

(56) References Cited

U.S. PATENT DOCUMENTS 5,150,890 * 9/1992 Kunikawa et al. ...................... 271/9
5,177,544 * 1/1993 Kimura et al. ....................... 355/308
5,448,324 * 9/1995 Okano et al. ........................ 354/277
5,700,003 * 12/1997 Sung .................................. 271/110
5,745,158 * 4/1998 Lee ..................................... 347/364
6,039,315 * 3/2000 Lim ..................................... 271/160
6,064,829 * 5/2000 Okutsu et al. ....................... 396/284

FOREIGN PATENT DOCUMENTS 61-213169 9/1986 (JP) .

* cited by examiner

*Primary Examiner*—Russell Adams
*Assistant Examiner*—Hung Henry Nguyen
(74) *Attorney, Agent, or Firm*—Sughrue, Mion, Zinn, Macpeak & Seas, PLLC

(57) ABSTRACT

A detecting lever for a remaining amount of recording papers is provided at the bottom of a paper cassette. The top of the detecting lever abuts on the recording paper contained in the paper cassette. As the recording paper is used, the detecting lever is rotated in a thickness direction of the recording papers. The rotation of the detecting lever is transmitted to an indicating lever, one end of which engages with the detecting lever. Upon rotation of the detecting lever, the other end of the indicating lever is adapted to be largely moved. A label for indicating the remaining amount of the recording paper is provided on the other end of the indicating lever. The remaining amount is represented by the label in accordance with the movement of the indicating lever.

15 Claims, 11 Drawing Sheets

(EMPTY)

(A LITTLE AMOUNT)

(LARGER AMOUNT)

INDICATING DEVICE USED FOR A PAPER CASSETTE AND FOR INDICATING A REMAINING AMOUNT OF RECORDING PAPERS

BACKGROUND OF THE INVENTION

1. Field of the Invention

The present invention relates to an indicating device used for a paper cassette and for indicating a remaining amount of recording papers supplied to a thermal printer or the like.

2. Description of the Related Art

As to thermal printers, there are a thermal sensitive printer and a heat transfer printer in each of which an exclusive recording paper is used. The recording paper (thermosensitive recording paper) used in the thermal sensitive printer comprises cyan, magenta and yellow thermosensitive coloring layers which are stacked on a support member, such as described in Japanese Patent Laid-Open Publication No. 61-213169. Each coloring layer has dispersed micro capsules in which coloring materials are contained. The respective coloring layers of the thermosensitive recording paper are colored by different heat energy. Thus, the coloring layer may be selectively colored by changing the applied heat energy. After the upper coloring layer has been thermally recorded, this upper layer is fixed, so as not to be colored again, before the lower layer is thermally recorded. Fixing the coloring layer is carried out such that the light having a particular wavelength, for example the ultraviolet ray, is applied to the recorded coloring layer. When the thermosensitive recording paper is exposed to an ordinary light source for a long time, its coloring properties are affected. Thus, the thermosensitive recording paper is contained in a light-shielding envelope, and this envelope is contained in a paper box.

When the printer is loaded with the recording paper, at first, a packing envelope is opened to take the paper package out of the envelope. Then, the recording package is set in a paper cassette. Further, this paper cassette is set in the printer.

In case of confirming an amount of the recording papers remaining in the paper cassette, it is necessary to take the paper package out of the paper cassette for observing it after the paper cassette has been taken out of the printer. This confirming work is troublesome. It is considered that a window for confirming the remaining amount of the recording papers is provided, such as a paper cassette in which an ordinary recording paper is contained. Through this window, the remaining amount of the recording papers may be directly observed. However, the thermosensitive recording paper has photosensitivity so that if the window for confirming the remaining amount is provided, the recording paper is exposed to the light. As a result, coloring properties of the recording paper are changed. Thus, it is not practical to confirm the remaining amount of the recording papers through the window. Moreover, the recording paper is thin so that a changing amount of the remaining amount is small when a change of the remaining amount is merely detected. Due to this, it is difficult to indicate the remaining amount with accuracy.

SUMMARY OF THE INVENTION

In view of the foregoing, it is a primary object of the present invention to provide an indicating device for a remaining amount of recording papers in which the remaining amount is indicated with accuracy in a state that light-shielding ability is kept.

It is a second object of the present invention to provide an indicating device for a remaining amount of recording papers in which the absence of the recording paper is surely represented.

It is a third object of the present invention to provide an indicating device for a remaining amount of recording papers in which the remaining amount can be easily confirmed.

In order to achieve the above and other objects, the indicating device according to the present invention comprises a remaining-amount detecting member and a remaining-amount indicating member.

The detecting member abuts on a recording paper contained in a paper cassette, and is moved in accordance with the remaining amount of the recording papers. The indicating member represents the remaining amount based on the movement of the detecting member.

It is preferable that the detecting member includes a lever section, the top of which abuts on the recording paper. The lever section is rotated in a thickness direction of the recording papers as the recording paper is used. Thus, the detecting member itself is also rotated in the thickness direction of the recording paper, and this rotation is transmitted to the indicating member.

The indicating member comprises an engaging section and an indicating section. The engaging section engages with the detecting member, and is integrally formed with the indicating section in an L-like shape. When the rotation of the detecting member is transmitted to the indicating member, the indicating section is moved more largely than the engaging section because a length of the indicating section is adapted to be longer than that of the engaging section.

An indicator is provided on the top of the indicating section. This indicator represents the remaining amount of the recording paper in accordance with the movement of the indicating section.

BRIEF DESCRIPTION OF THE DRAWINGS

The above objects and advantages of the present invention will become apparent from the following detailed description of the preferred embodiments of the invention when read in conjunction with the accompanying drawings, in which.

DETAILED DESCRIPTION OF THE PREFERRED EMBODIMENT(S)

Figure 1:
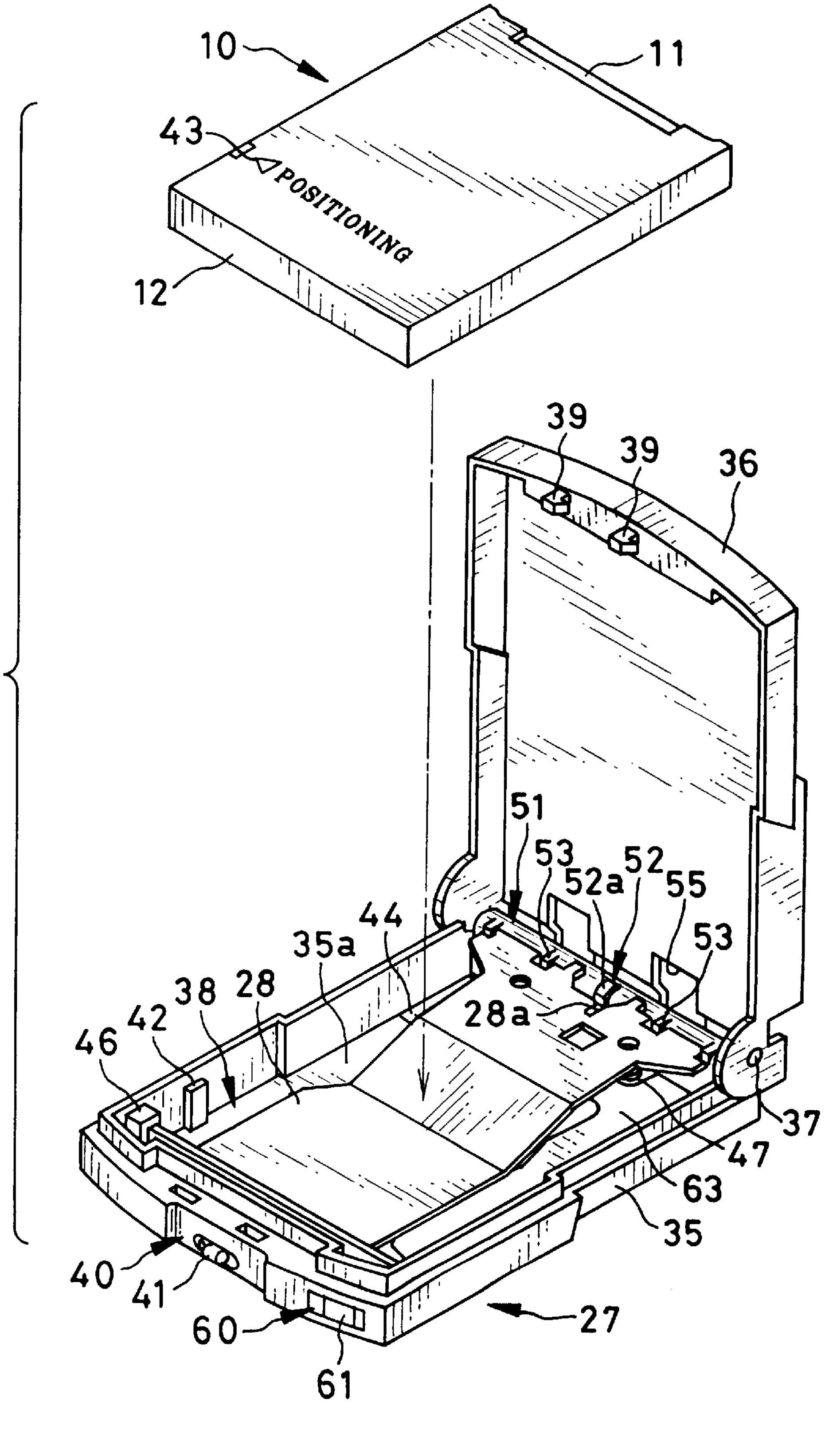
FIG. 1 is a perspective view showing a paper package and a paper cassette having a built-in indicating device for a remaining amount of recording papers according to the present invention.

FIG. 1 is a perspective view showing a paper cassette having a built-in indicating device for a remaining amount of recording papers according to the present invention. The paper cassette 27 is constituted of a cassette body 35 and a lid 36 to contain a paper package 10. The whole of the paper cassette 27 is formed in a box-like shape.

Figure 2:
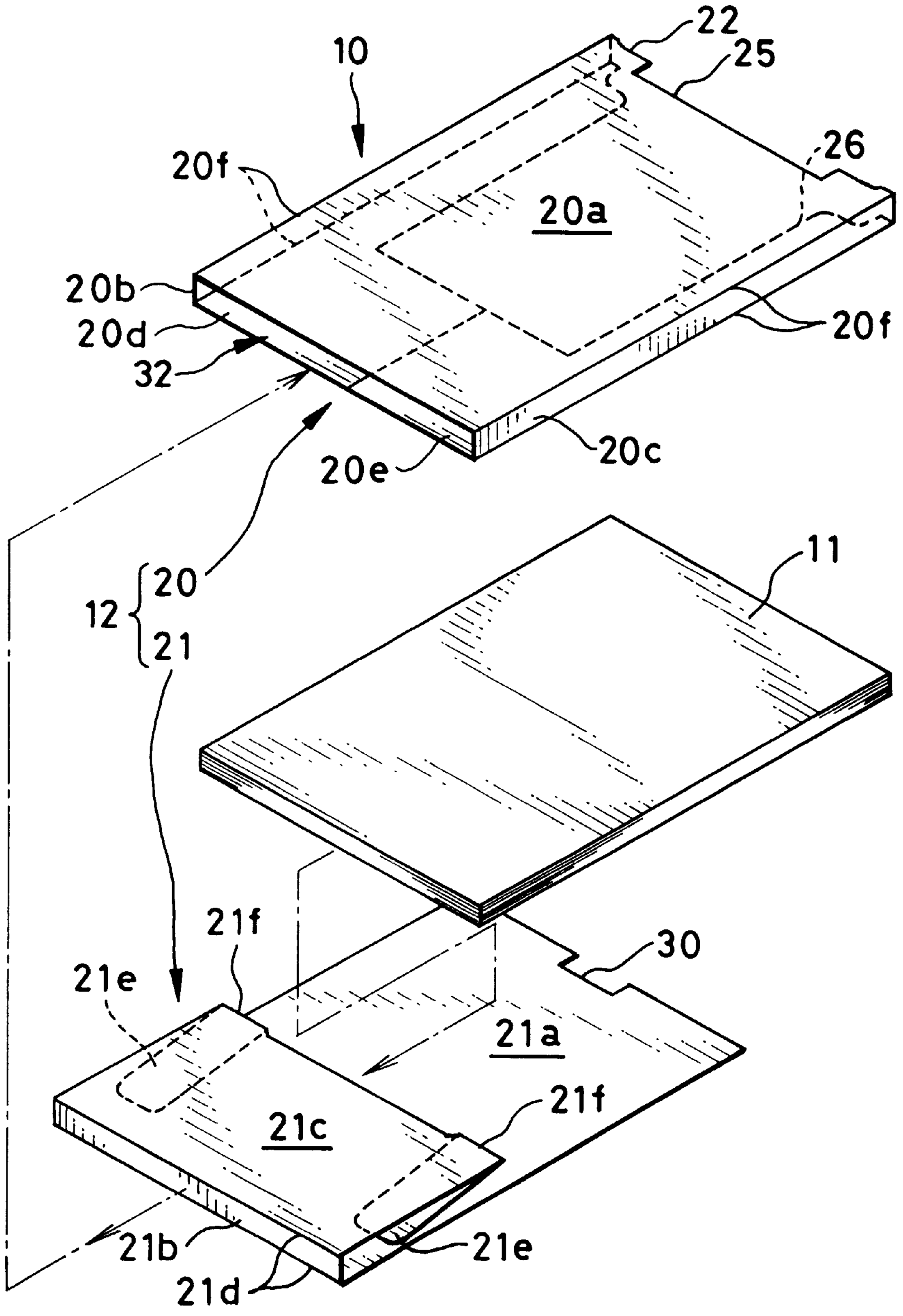
FIG. 2 is an exploded perspective view of the paper package.

As shown in FIG. 2, the paper package 10 includes a thermosensitive recording paper (hereinafter recording paper) 11 and a packaging member 12. The recording papers 11 are stacked, and the packaging member 12 is made of a dust-free paper having a long fiber. The dust-free paper is made of a multi-layer structural material being carded. An outer surface layer of the dust-free paper contains light-shielding substances comprising a black paint and so forth. Further, the outer surface layer is laminated with a resin film being as a moisture-proof agent.

The twenty recording papers 11 are stacked in a state that its support member is positioned at an upside and its thermosensitive coloring face is directed downward. In this state, the recording papers are contained in the packaging member 12. Incidentally, when a thick recording paper for seal printing is used, ten papers can be stacked, for example, instead of twenty.

The packaging member 12 is constituted of a rectangular parallelepiped outer member 20 and an inner member 21 which is inserted into the outer member 20 from its end portion 32.

The outer member 20 is constituted of an upper portion 20*a*, two side portions 20*b* and 20*c*, and bottom portions 20*d* and 20*e* divided into two pieces. These portions are bent along bend lines 20*f* at 90 degrees. Edges of the bottom portions 20*d* and 20*e* are overlapped and adhered so as to form a thin rectangular parallelepiped shape. The outer member 20 is made such that the surface laminated by the resin film faces the outside.

The other end portion of the outer member 20 is a paper slot 22 for feeding the recording paper. The upper portion 20*a* is formed with a roller slit 25 for inserting a roller. The roller slit 25 continues to the paper slot 22. A paper feeding roller 24 of a thermal printer enters the roller slit 25 (see FIG. 4).

Upon connection of the bottom portions 20*d* and 20*e*, an opening 26 is formed so as to lead to the paper slot 22. A pushing-up plate 28 of the paper cassette 27 (see FIG. 4) goes through the opening 26 to press the recording paper 11 against a paper feeding roller 24.

The inner member 21 is formed by bending a movable bottom section 21*a*, a side section 21*b*, and a pushing section 21*c* along bend lines 21*d* at 90 degrees. A laminated face of the inner member 21 is adapted to be directed outward. The top edge of the pushing section 21*c* is provided with spring sections 21*e* connected via bend lines 21*f*.

The recording papers 11 are inserted between the bottom section 21*a* and the pushing section 21*c* in a state that the recording face of the recording paper 11 is directed to the bottom section 21*a*. The spring section 21*e* is bent toward the bottom section 21*a*. Owing to a spring peculiarity of its bent portion, the recording paper 11 is urged toward the bottom section 21*a*. Thus, the recording paper 11 is held by the bottom section 21*a* and the spring section 21*e*.

A cutout 30 for detecting a remaining amount of the recording papers is formed at the center of an edge portion of the bottom section 21*a*. A remaining-amount detecting lever, which is described later, goes through the cutout 30 to abut on the recording paper 11.

The inner member 21 is inserted into the outer member 20 through the end portion 32 thereof being opposite to the paper slot 22. The side section 21*b* of the inner member 21 is formed so as to slightly project by a thickness of the outer member 20. This projecting portion becomes a stopper abutting on the edges of the side portions 20*b* and 20*c* of the outer member 20. Owing to this, the inner member 21 is prevented from entering the outer member 20 more deeply.

As shown in FIG. 1, the lid 36 is attached to the cassette body 35 via an attachment shaft 37. The paper package 10 is put into a package chamber 38 under an opening condition in which the lid 36 stands up. Under a closing condition in which the lid 36 is horizontal, a claw 39 engages with a lock device 40 provided in the cassette body 35 so that the closing condition is maintained. When the lid 36 is opened, a lock releasing button 41 is slid to release the claw 39 of the lid 36 from engaging with a claw of the lock device 40. Upon this, the lid 36 becomes openable.

The package chamber 38 is formed so as to be a little larger than the paper package 10. Thus, loading the package chamber 38 with the paper package 10 can be easily performed. One of side walls of the package chamber 38 is formed with a protrusion 42 for adjusting a position of the paper package 10. On the other hand, the outer member 20 is provided with a positioning mark 43 printed on a upper surface thereof. By inserting the paper package 10 into the cassette body 35 so as to adjust the positioning mark 43 to the protrusion 42, the recording package 10 is faced in the correct direction so that failure in loading is prevented.

Figure 4:
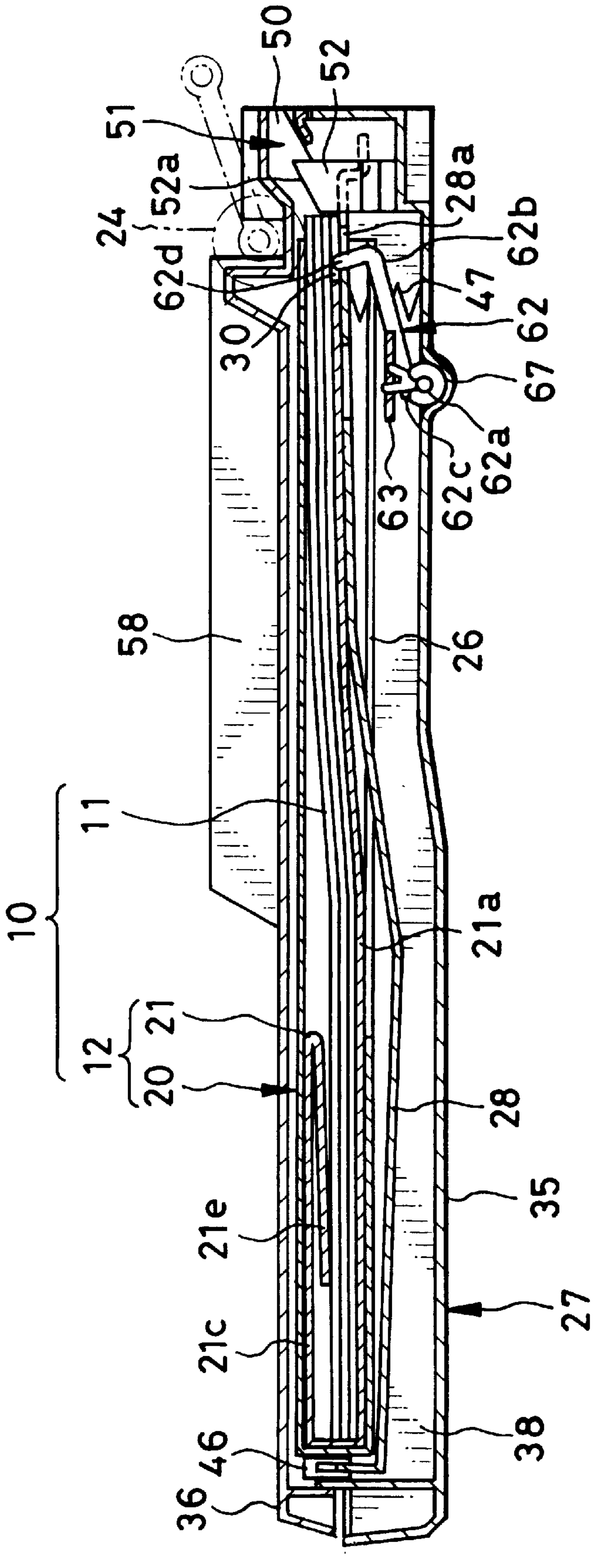
FIG. 4 is a sectional view of the paper cassette.

As shown in FIG. 4, the pushing-up plate 28 is rotatably attached to the package chamber 38 via an attachment section 46. The pushing-up plate 28 is urged upward by a coiled spring 47 to push up the bottom section 21a arranged in the paper package 10.

When the lid 36 is closed, a space is formed near the attachment shaft 37, and between the cassette body 35 and the lid 36. This space constitutes a paper mouth 50. A paper passage near the paper mouth 50 is formed with a paper separating section 51 projecting at the side of the cassette body 35.

As shown in FIG. 1, at the center of the paper separating section 51, is disposed a paper separating block 52 made of rubber. The paper separating block 52 has an inclined upper face 52*a* obliquely projecting into the paper passage. When the recording papers 11 are advanced in an overlapping state, only the lower recording paper 11 is retained owing to friction caused by the separating block 52, and only the upper recording paper 11 is fed. Further, the paper separating section 51 is provided with two separating projections 53 being apart from each other. The separating projections 53 stop the leading edge of the lower recording paper 11 when the double recording papers 11 are advanced. Thus, the advancement of the lower recording paper 11 is prevented.

Figure 3:
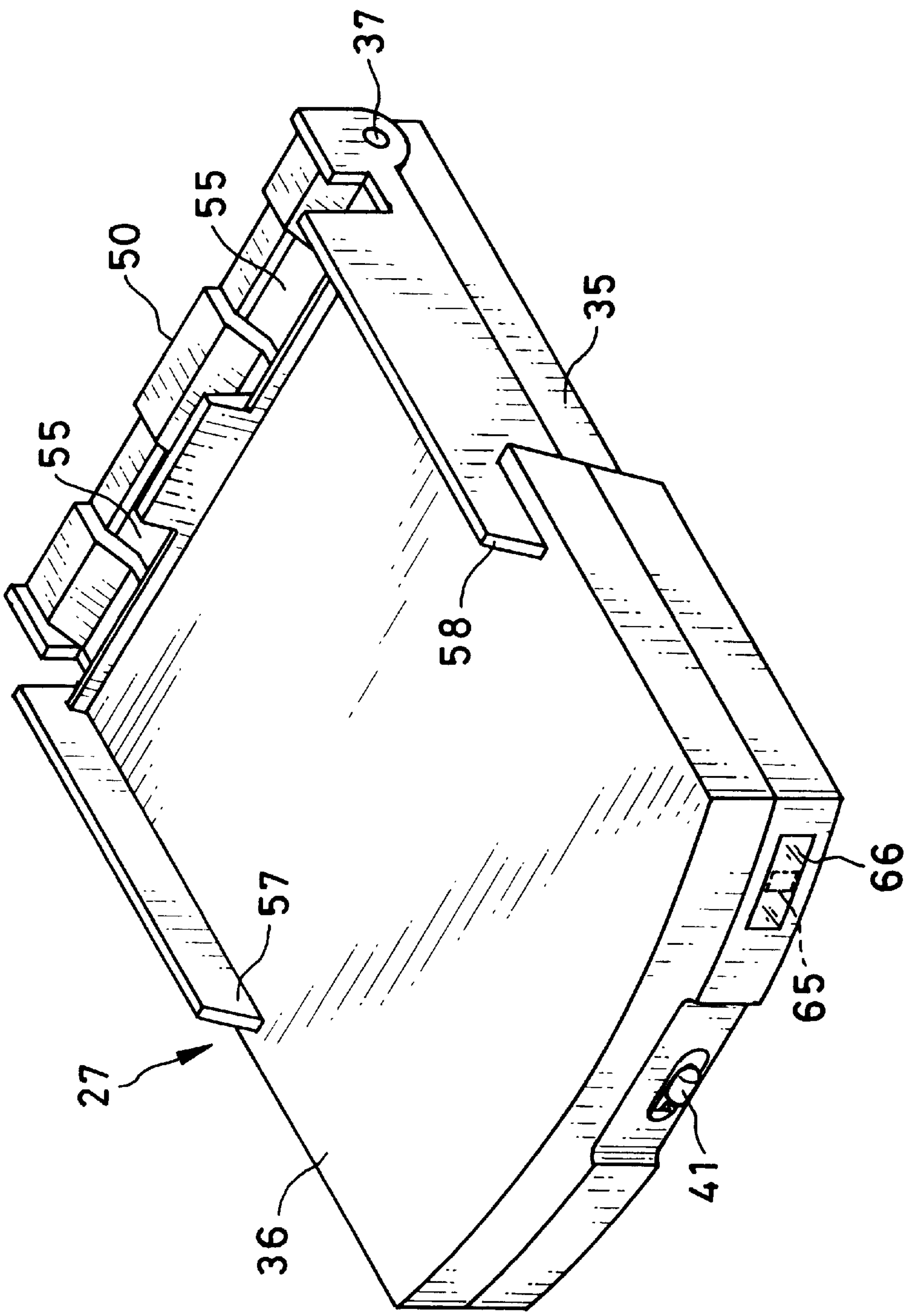
FIG. 3 is a perspective view showing the paper cassette in a closing state.

As shown in FIGS. 1 and 3, the lid 36 of the paper cassette 27 is formed with a roller opening 55 arranged at a position corresponding to the roller slit 25 of the paper package 10. The paper feeding roller 24 goes through the roller opening 55 to come into contact with the uppermost recording paper 11 in the paper package 10, such as shown in FIG. 4. The paper feeding roller 24 is rotated in a paper feeding direction at the time of printing. Only the uppermost recording paper 11 is drawn out from the paper package 10 and is fed to a print stage of the thermal printer.

Figure 5:
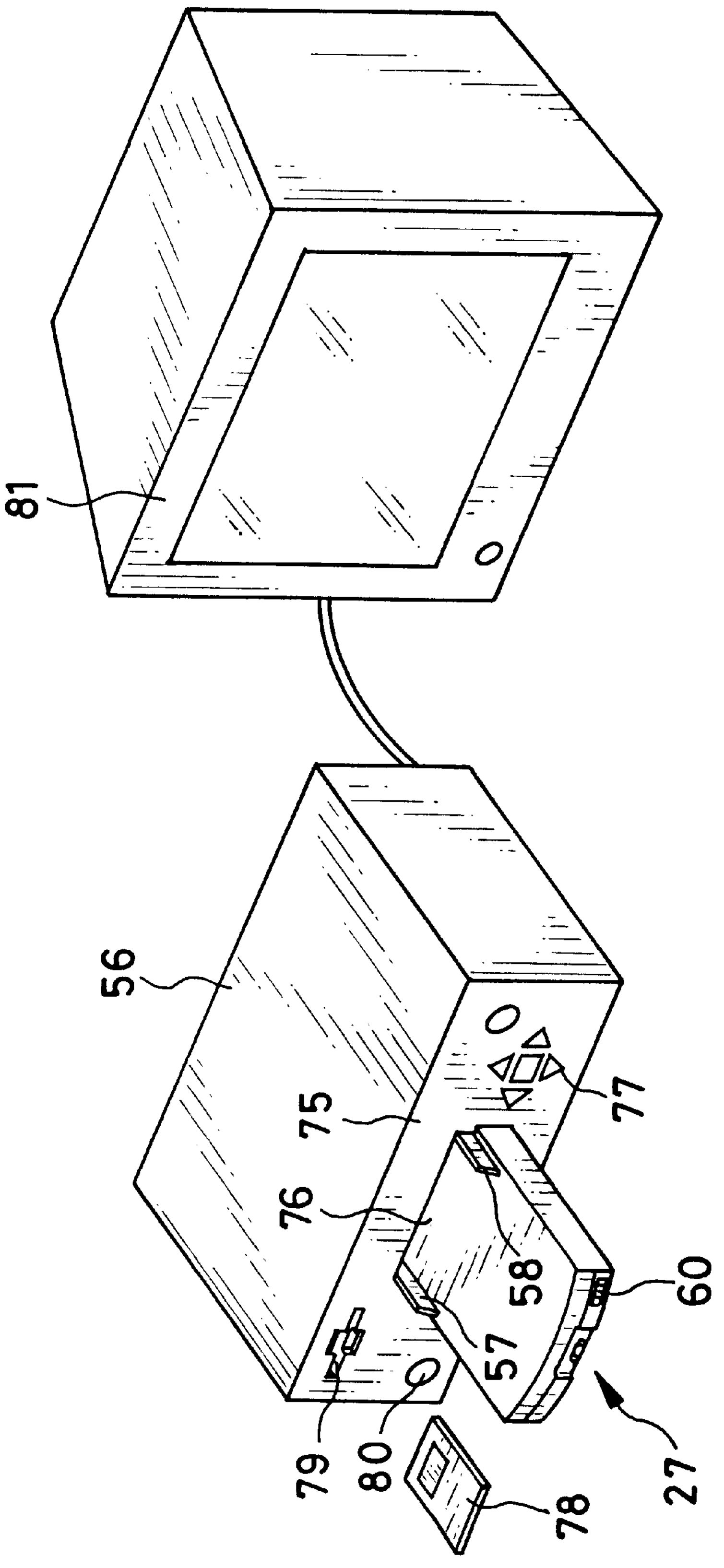
FIG. 5 is a perspective view showing a thermal printer loaded with the paper cassette.

As shown in FIGS. 3 and 5, the upper surface of the lid 36 is used as a paper tray. For this, both ends of the lid 36 are provided with paper guides 57 and 58 projecting upward. The paper guides 57 and 58 are for guiding both side edges of the recording paper 11, and are formed so as to be elongated along the long side of the lid 36.

Figure 7:
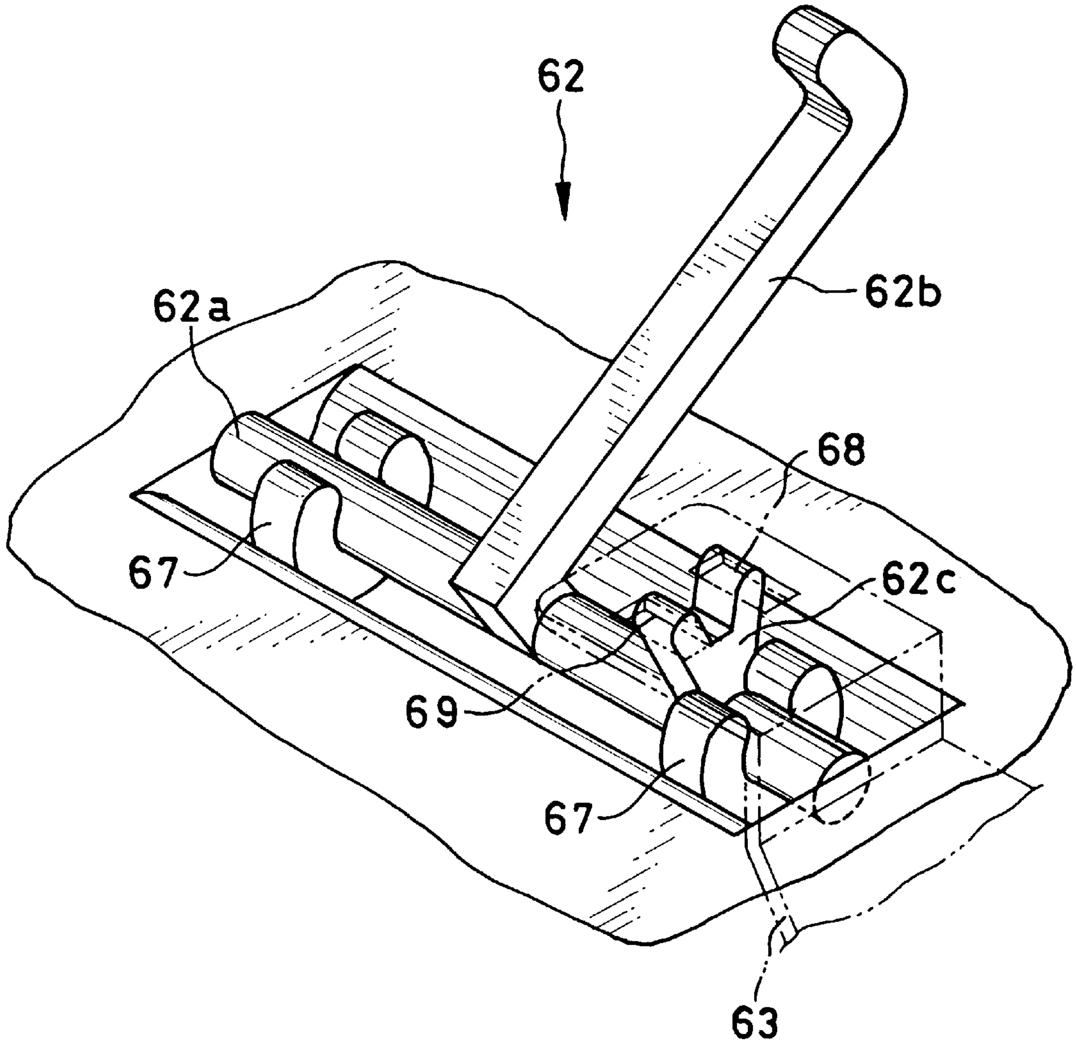
FIG. 7 is a perspective view showing a remaining-amount detecting lever.

As shown in FIGS. 1 and 7, the cassette body 35 is provided with an indicator 60 for indicating the remaining amount of the recording papers 11. The indicator 60 is constituted of a remaining-amount indicating window 61, a remaining-amount detecting lever 62, a remaining-amount indicating lever 63, and a support plate 64. As shown in FIG. 3, the indicating window 61 is constituted of an opening 65 formed in the cassette body 35, and a transparent plastic plate 66 for covering the opening 65. The indicating window 61 is provided in an edge portion of the paper cassette 27 being opposite to the paper mouth 50 thereof.

As shown in FIG. 7, the detecting lever 62 is rotatably attached to bearings 67 provided on a bottom portion 35a of the cassette body 35. The detecting lever 62 is integrally formed such that a detecting section 62*b* and an engaging section 62*c* project from an attachment shaft 62*a*. As shown in FIG. 4, a tip of the detecting section 62*b* projects in a thickness direction of the recording paper 11. In this way, a projecting section 62*d* is formed. The projecting section 62*d* is arranged such that the tip thereof projects through both of a cutout 28*a* of the pushing-up plate 28 and the cutout 30 of the inner member 21.

As shown in FIG. 7, the engaging section 62*c* is formed with two engaging claws 68 projecting from the top thereof. Each engaging claw 68 goes through an engaging hole 69 formed at one end of the indicating lever 63. By means of the engaging claws 68, rotation of the detecting lever 62 is transmitted to the indicating lever 63.

Figure 6:
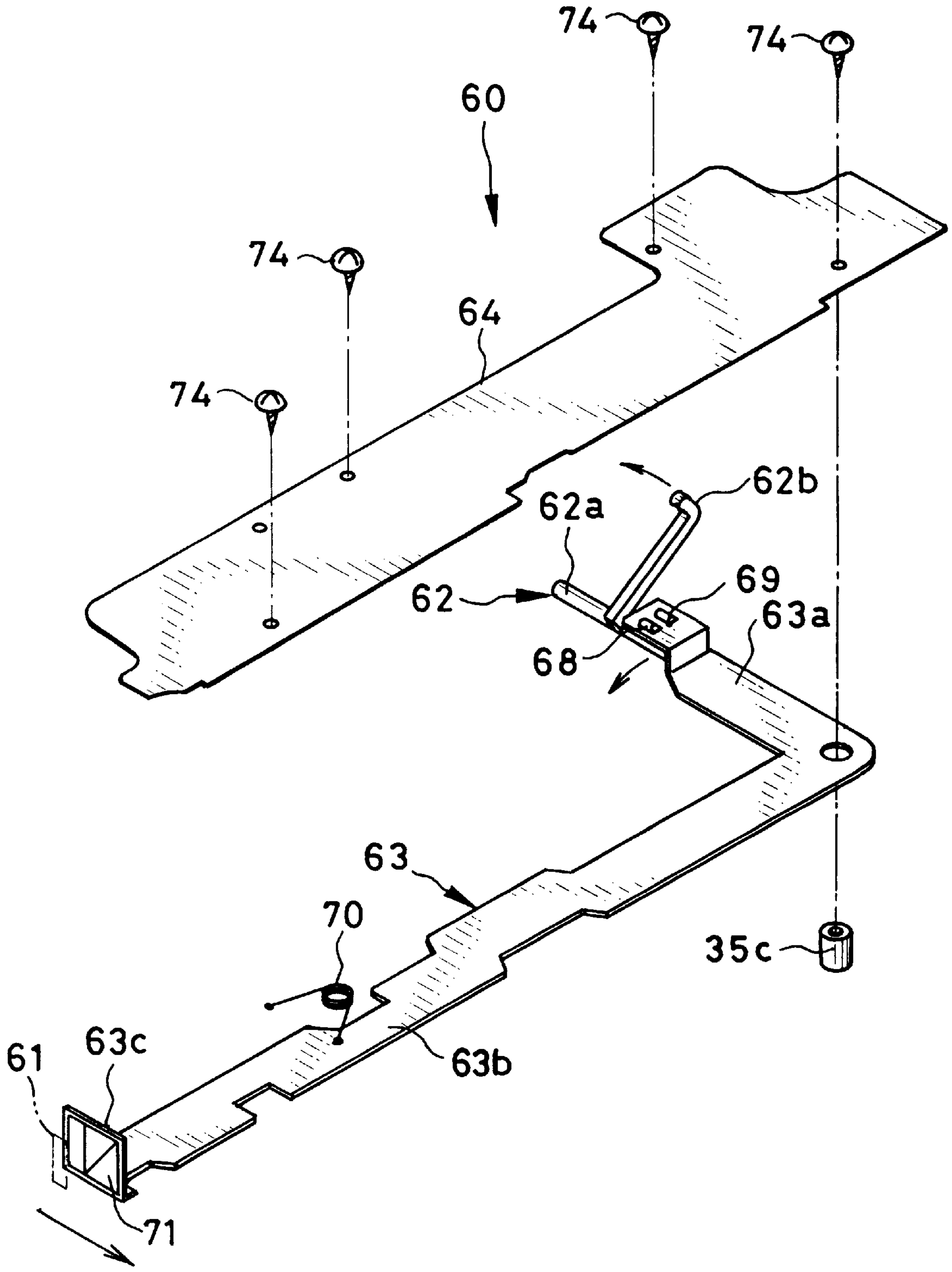
FIG. 6 is an exploded perspective view showing an indicator for indicating the remaining-amount of the recording paper.

As shown in FIG. 6, the indicating lever 63 is formed such that an engaging section 63*a* and an indicating section 63*b* are connected in an L-like shape. The indicating lever 63 is rotatably attached to the bottom portion 35*a* of the cassette body 35 by means of an attachment shaft 35*c*. The support plate 64 is fixed to the indicating lever 63 with screws 74.

A torsion spring 70 is disposed between the indicating lever 63 and the bottom portion 35*a* to urge the indicating lever in a counterclockwise direction. A length from the top of the indicating lever 63*b* to the attachment shaft 35*c* is longer than a length from the engaging hole 69 of the engaging section 63*a* to the attachment shaft 35*c*. Due to this, a small rotational amount of the detecting lever 62 is converted to a large rotational amount of the top of the indicating lever 63.

The top of the indica ting section 63*b* is bent at 90 degrees to form a label sticking section 63*c* on which a remaining-amount indicating label 71 is stuck.

As shown in FIG. 8, the label 71 is arranged at a position facing the window 61. The label 71 is constituted of indicating areas 72 and 73. The indicating area 72 shows that the remaining amount is zero. The indicating area 73 shows the remaining amount by a ratio of a white area to a green area. The indicating area 72 is painted red. When the indicating area 72 is indicated in the indicating window 61 of the cassette body 35, the absence of the recording paper 11 may be recognized at a glance.

Figure 8A:
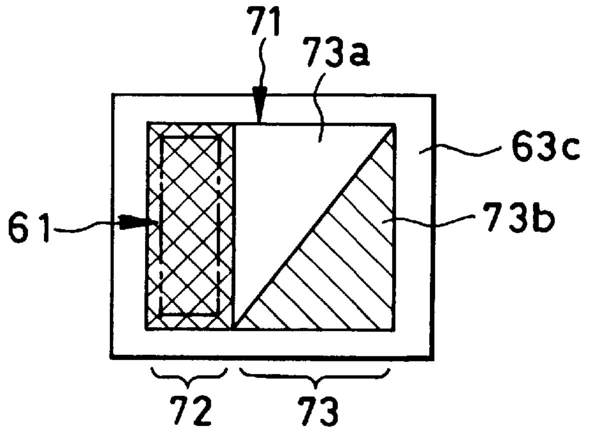
FIGS. 8A, 8B and 8C are explanatory illustrations showing a positional relationship between a remaining-amount indicating window and a remaining-amount indicating label.
Figure 8B:
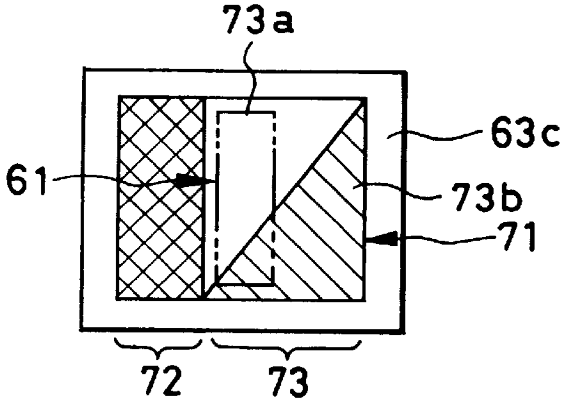
Figure 8C:
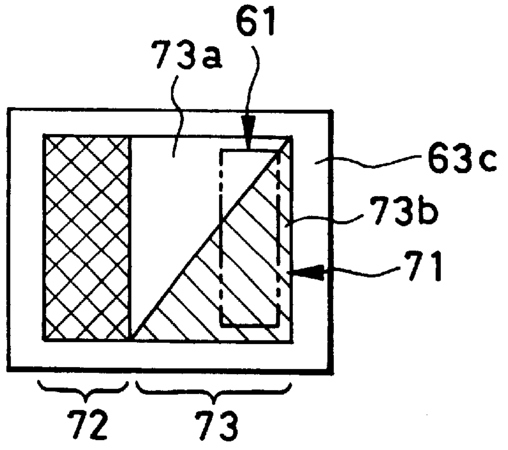

The indicating area 73 is divided into two triangle areas by a diagonal line. The upper triangle area is painted white, and the lower triangle area is painted green. The white area 73*a* and the green area 73*b* are observed in the indicating window 61, and the remaining amount is shown by the ratio of the white area 73*a* to the green area 73*b*. For example, as shown in FIG. 8C, when the green area 73*b* is larger than the white area 73*a* in the indicating window 61, the remaining amount of the recording papers 11 is indicated as being large. In contrast, as shown in FIG. 8B, when the white area 73*a* is larger than the green area 73*b*, the remaining amount is indicated as being small.

Figure 9:
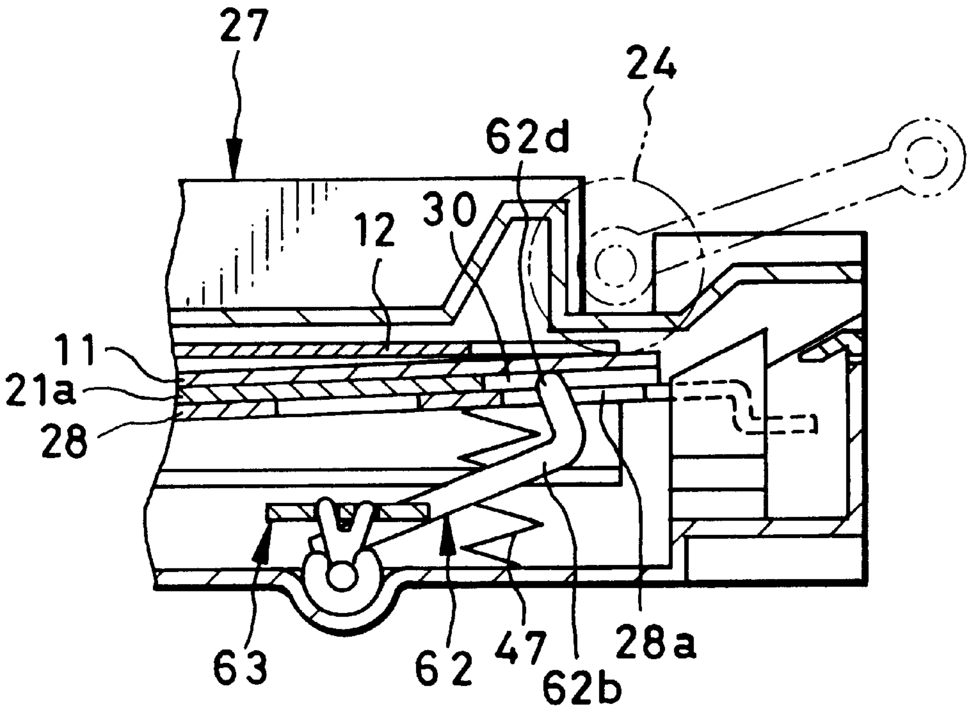
FIG. 9 is a partial section view showing a positional relationship between the recording paper and the detecting lever in a state that there is a small remainder of the recording papers.
Figure 11:
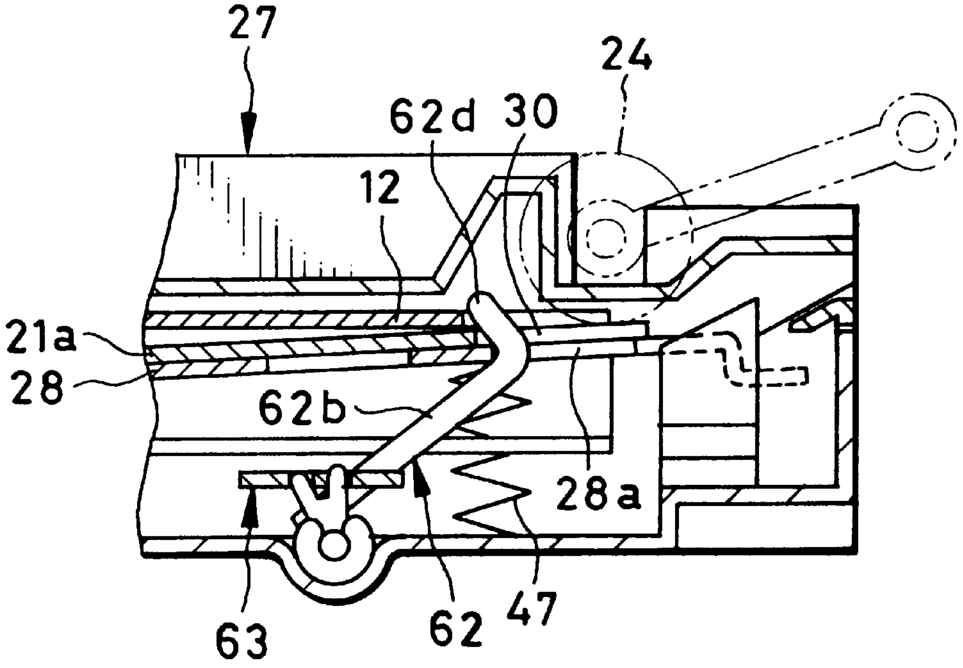
FIG. 11 is a partial section view showing the detecting lever in a state that the recording paper is used up.

As shown in FIG. 9, the lowermost recording paper 11 is moved toward the paper feeding roller 24 in accordance with the decrease of the remaining amount. This movement is detected as the rotation of the detecting lever 62. As shown in FIG. 7, the rotation of the detecting lever 62 is transmitted to the indicating lever 63 via the engaging section 62*c*. Upon this, as shown in FIG. 6, the top of the indicating section 63*b* is rotated in the counterclockwise direction. In accordance with this rotation, the label 71 is displayed in the indicating window 61 such as shown in FIGS. 8C to 8A.

Figure 10:
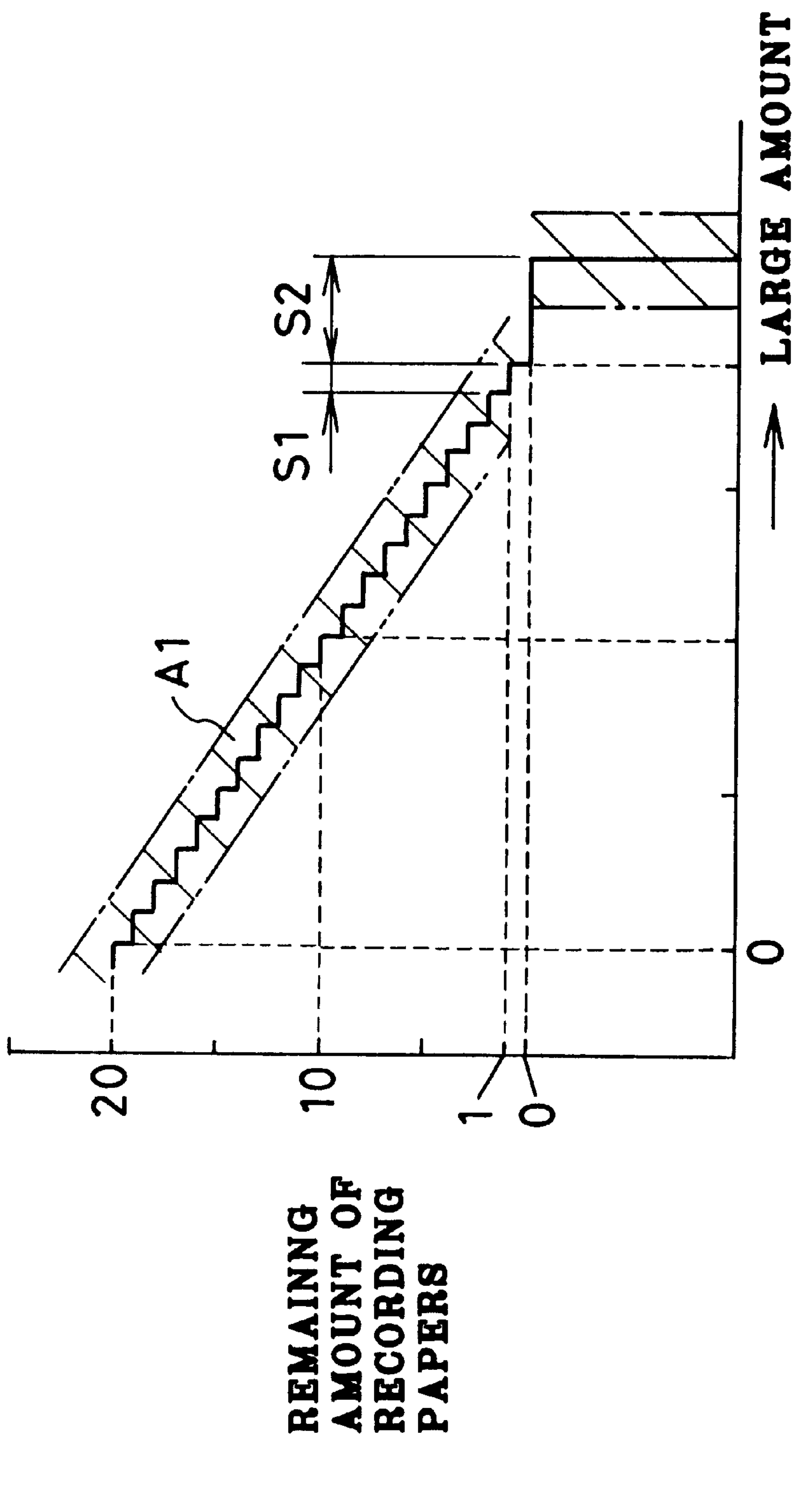
FIG. 10 is a graph showing a relationship between the remaining amount of the recording papers and a moving amount of the remaining-amount indicating label.

FIG. 10 is a graph showing a relationship between the remaining amount of the recording papers 11 and the moving amount of the label 71. As the recording paper 11 is used, the moving amount of the label 71 increases. The relationship between the remaining amount of the recording paper and the moving amount of the label 71 is linear. However, if a curve of the recording paper 11 occurs, an error of the moving amount of the label 71 becomes large. For example, regarding such error, its error range A1 is shown by hatching in FIG. 10.

When the recording paper 11 is used up, the projecting section 62*d* of the detecting lever 62 deeply enters the packaging member 12 through the cutouts 28*a* and 30 of the pushing-up plate 28 and the bottom section 21*a*. The entering amount of the projecting section 62*d* at this time is adjusted such that the rotational amount of the detecting lever 62 is greater in comparison with the circumstance in that the recording papers 11 are decreased one by one. Thus, as shown in FIG. 10, when the remaining amount of the recording papers 11 changes from “1” to “0”, the moving amount S2 of the label 71 is greater by a few times of the previous moving amount S1. Thus, the indicating window 61 is simultaneously changed from the indicating area 73 showing a little remaining amount to the red indicating area 72 showing the absence of the recording paper, such as shown in FIGS. 8B and 8A. Even if the curve of the recording paper 11 occurs, it is possible to surely indicate the remaining amount “0” of the recording paper 11.

When the recording papers 11 remain, the indicating area 73 including the green area 73*a* and the white area 73*b* is displayed in the indicating window 61, such as shown in FIGS. 8B and 8C. Due to this, it is recognized at a glance that the recording paper 11 remains. The remaining amount of the recording papers is known from a decreasing extent of the thickness of the stacked recording papers. For this, the detecting lever 62 is rotated in accordance with the thickness of the recording papers. Upon the rotation of the detecting lever 62, the ratio of the white area 73*a* to the green area 73*b* is changed in the indicating window 61 so that the decrease of the recording papers is known when the green area 73*b* becomes small.

FIG. 5 is a perspective view showing a thermal printer 56. A front face 75 of the thermal printer 56 is formed with an insertion opening 76 into which the paper cassette 27 is inserted. When the paper cassette 27 is set into the insertion opening 76, the paper feeding roller 24 goes through the roller opening 55 of the lid 36, such as shown in FIGS. 3 and 4. The recording paper 11 in the paper cassette 27 is urged upward by the pushing-up roller 28 so that the uppermost recording paper 11 is adapted to always come into contact with the paper feeding roller 24.

The front face 75 is provided with a key section 77, an insertion slot 79 for a smart medium 78, and a power switch 80, besides the insertion opening 76. When the key section 77 is operated to instruct printing, a print image is displayed in a television set being as an external display 81. After confirming the image, a print key of the key section 77 is operated. Upon this, printing is started.

When printing is performed, at first, the paper feeding roller 24 is rotated in the paper feeding direction. Only the uppermost recording paper 11 is drawn out of the paper package 10 contained in the paper cassette 27, and is fed into the thermal printer 56. For the recording paper 11 having been fed, as well known, recording is performed by a thermal head in a three-color frame-sequential manner. Recording is performed one line by one line. At this time, each heating element of the thermal head is driven in synchronism with the advancement of the recording paper 11. The heating element corresponds to a recorded pixel. Successively, a corresponding fixing lamp is turned on to carry out optical fixation. Thus, the recorded thermosensitive coloring layer does not color when the next layer is thermally recorded. After the three-color images have been recorded in the frame sequential manner, the recording paper 11 is discharged onto the lid 36 of the paper cassette 27. Then, printing is over.

When the remainder of the recording paper 11 is a little amount, the bottom section 21*a* of the packaging member 12 is lifted by the pushing-up plate 28. On the other hand, the pushing section 21*c* and the spring section 21*e* press the uppermost recording paper 11 downward. Accordingly, a gap is prevented from occurring between the recording papers 11. Further, dampproof properties and light-shielding properties are prevented from being lowered. Moreover, the bottom section 21*a* of the inner member 21 tightly contacts the recording paper 11. Thus, although the opening 26 is formed in the bottom portions 20*d* and 20*e* of the outer member 20, dust and so forth hardly enter the spaces between the respective recording papers 11.

Figure 12:
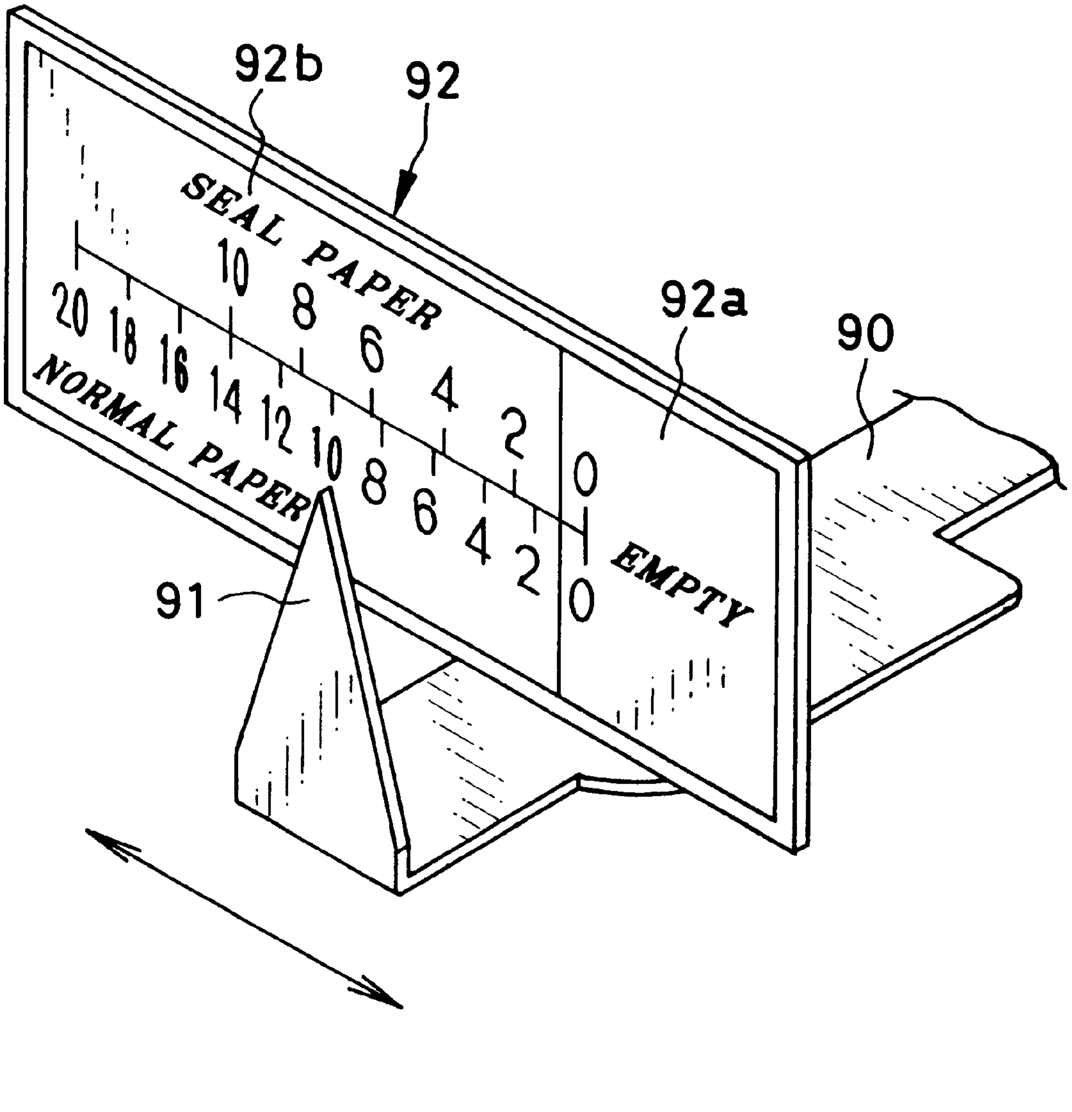
FIG. 12 is a perspective view showing a pointer of the remaining-amount indicating lever and a scale label in another embodiment.

In the above embodiment, the label sticking section 63*c* is provided on the top of the indicating lever 63. However, as shown in FIG. 12, a pointer 91 having a triangle shape may be provided on the top of an indicating lever 90. In this case, a scale label 92 being as the remaining-amount indicating label is provided near the pointer 91. The scale label 92 includes an empty indicating portion 92*a* and a number indicating scale 92*b*. The number indicating scale 92*b* comprises a seal-paper scale for a seal-type recording paper, and a normal-paper scale for normal recording paper.

In the above embodiment, the present invention is applied to the thermosensitive recording paper. However, this is not exclusive, for example, the present invention may be applied to recording papers of a sublimate type and a thermally melting type. Further, the present invention may be also applicable to recording papers of an ink jet system and a laser printing system.

In the present invention, the recording paper in the paper cassette is not directly watched through a transparent window or the like so that the recording paper is not exposed to the light. Thus, the coloring property of the recording paper does not change.

According to the present invention, the remaining amount of the recording papers can be indicated with accuracy. Further, the whole of the device may be compacted.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. An indicating device used for a paper cassette and for indicating a remaining amount of a plurality of recording papers, said paper cassette containing said recording papers in a stacked state, and each of said recording papers being supplied to a printer one by one through a paper mouth, said indicating device comprising:

a plate for supporting said recording papers, said plate pushing said recording papers such that an uppermost paper in said recording papers faces said paper mouth;

a penetration portion formed in said plate;

a remaining-amount detecting lever having a top which abuts on said recording papers through said penetration portion, said remaining-amount detecting lever moving in a thickness direction of said recording papers in accordance with said remaining amount of said recording papers; and a remaining-amount indicating lever moved in association with said remaining-amount detecting lever and enlarging and transmitting a rotational amount of said detecting lever, said remaining-amount indicating lever displaying said remaining amount based on a moving amount of said remaining-amount detecting lever.

2. An indicating device according to claim 1, wherein said indicating lever comprises a lever section, both ends of which are respectively provided with an engaging section and an indicating section, said engaging section engaging with said detecting lever and said indicating section being bent substantially at right angles relative to said lever section.

3. An indicating device according to claim 2, wherein said lever section is substantially formed in an L shape, and is horizontally rotated around a shaft on a bottom face of said paper cassette.

4. An indicating device according to claim 3, wherein a length from said shaft to said indicating section is longer than a length from said shaft to said engaging section, whereby, a rotational amount of said indicating section is larger than a rotational amount of said engaging section.

5. An indicating device according to claim 4, wherein said detecting lever abuts on said plurality of recording papers, which are stacked in a vertical direction, from a lower side of said detecting lever to rotate in a vertical direction in accordance with said remaining amount.

6. An indicating device according to claim 5, wherein said detecting lever gradually rotates when said recording papers remain, and said detecting lever largely rotates when said recording papers are used up.

7. An indicating device according to claim 6, wherein a rotational shaft of said detecting lever is provided with a projection engaging with a hole formed in said engaging section of said indicating lever, the vertical rotation of said detecting lever is converted to a horizontal rotation of said indicating lever by said projection and said hole.

8. A n indicating device according to claim 7, wherein said shaft of said indicating lever is located at a corner of said L-shaped lever section.

9. An indicating device according to claim 8, wherein said indicating lever is urged by a spring so as to press said detecting lever against said recording papers.

10. An indicating device according to claim 9, wherein a top of said indicating section is provided with a label for displaying said remaining amount, said label being observable through an indicating window formed in an end-edge face of said paper cassette, and, said label is moved in said indicating window in accordance with a movement of said indicating section, whereby said remaining amount is displayed.

11. An indicating de vice according to claim 10, wherein said label includes a first indication area for showing an absence of said remaining amount, and a second indication area showing a rate of said remaining amount.

12. An indicating device according to claim 9, wherein a top of said indicating section is provided with a pointer for pointing said remaining amount, further, a scale for representing s aid remaining amount is disposed near said pointer, said remaining amount being shown by pointing said scale with said pointer.

13. An indicating device according to claim 12, wherein said scale includes an indication area for showing an absence of said remaining amount.

14. An indicating device according to claim 1, wherein said papers are contained in a paper box having an opening formed at a leading portion thereof, and said paper box is set on said plate and has a cutout corresponding to said penetration portion, into which said top of said remaining-amount detecting lever inserts.

15. An indicating device according to claim 14, wherein said paper cassette comprises a cassette body for containing said paper box, and a lid attached to said cassette body via a hinge so as to be openable.

* * * * *